June 29, 1943.  J. A. TARBURTON  2,323,163
LOCATOR FOR SUBMERGED AIRCRAFT AND THE LIKE
Filed July 11, 1942   2 Sheets-Sheet 2
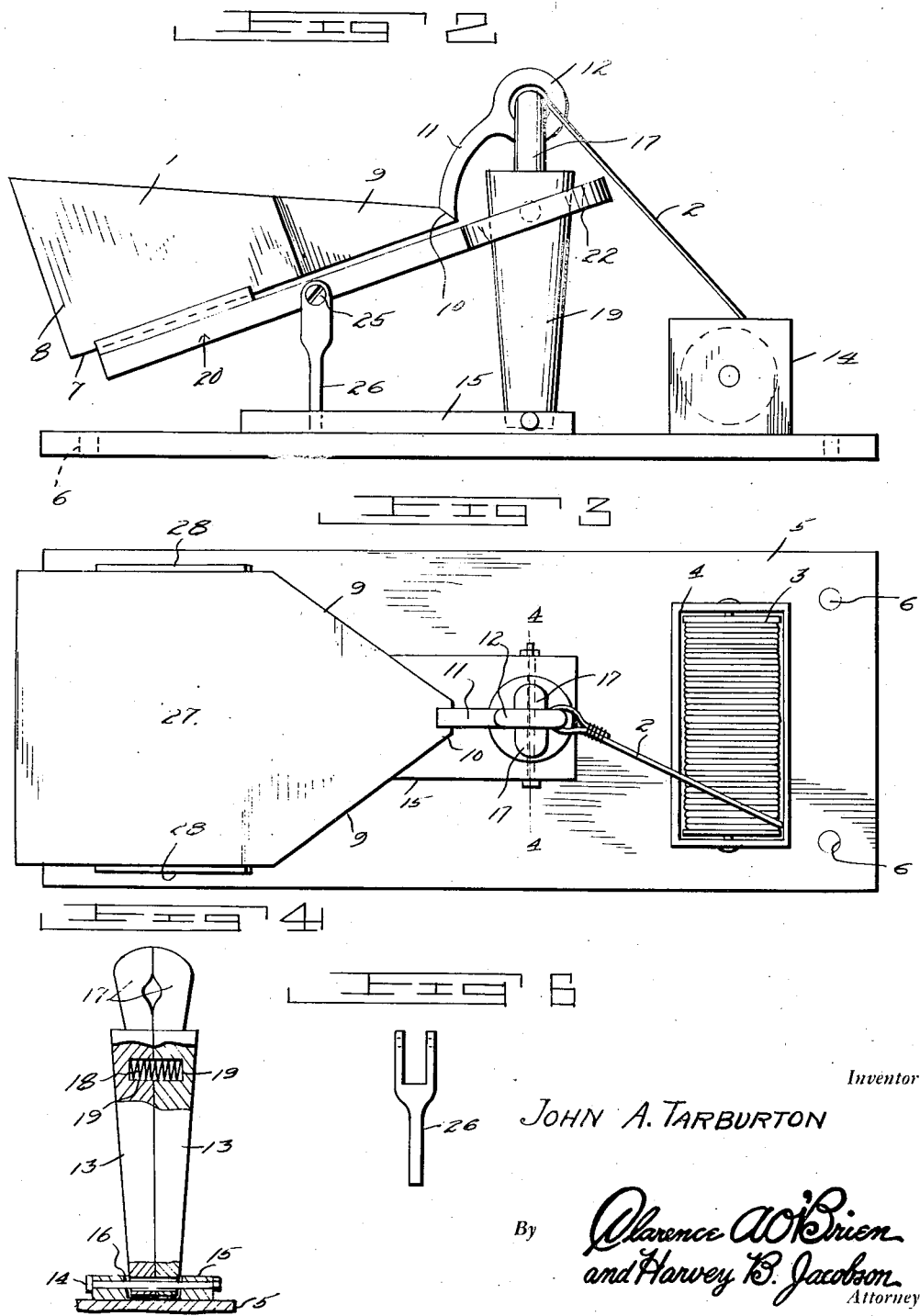
Inventor
JOHN A. TARBURTON
By *Clarence A. O'Brien and Harvey B. Jacobson*
Attorneys Patented June 29, 1943

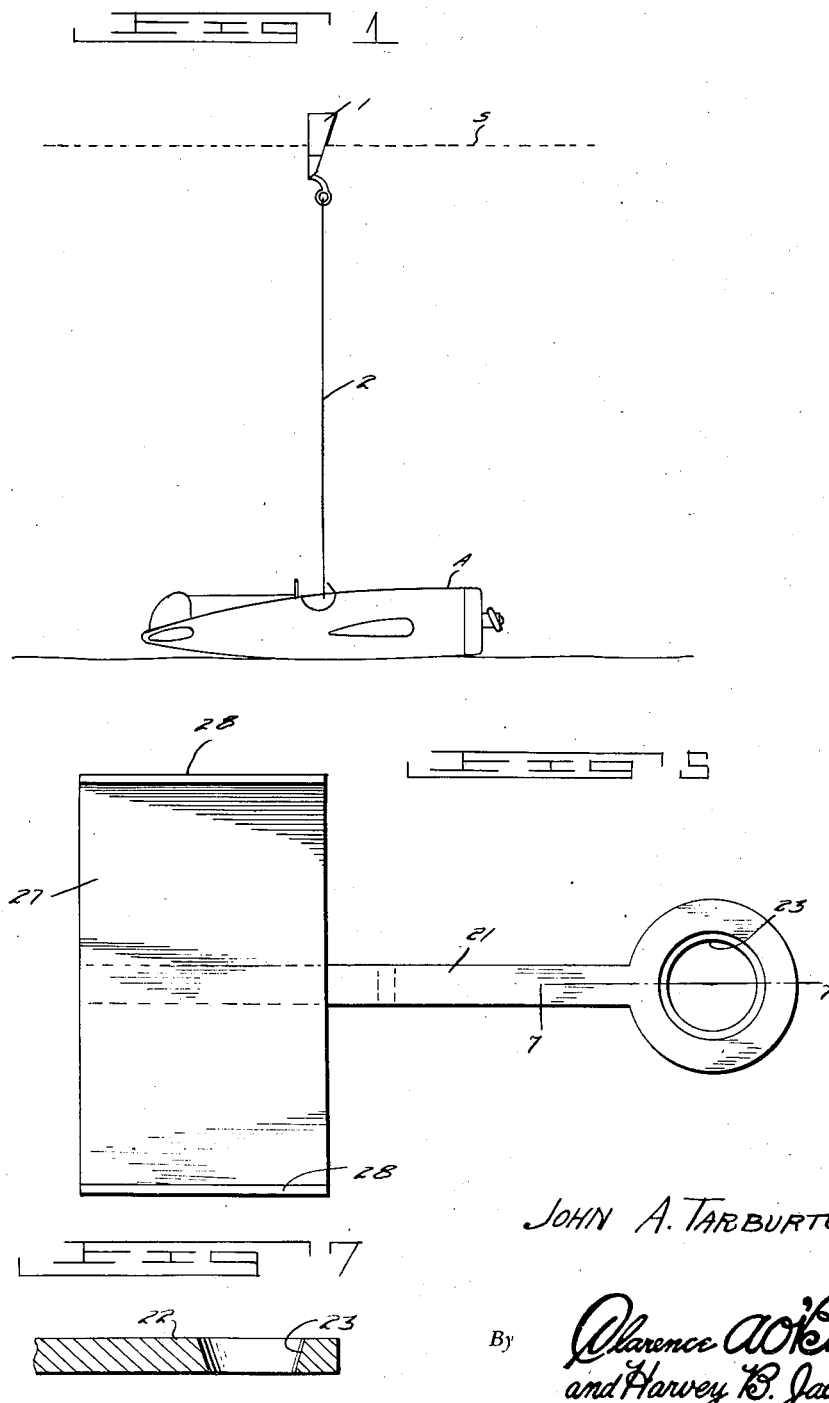

2,323,163

UNITED STATES PATENT OFFICE 2,323,163

LOCATOR FOR SUBMERGED AIRCRAFT AND THE LIKE

John A. Tarburton, Dover, Del.

Application July 11, 1942, Serial No. 450,636

3 Claims. (Cl. 9—9)

My invention relates to improvements in locator devices for marking the location of sunken or submerged aircraft, vessels, or the like, and more particularly airplanes.

The principal object of the invention is to provide an efficient, simply constructed, and reliable device for indicating on the surface where sunken aircraft or vessels may be found so that salvaging operations and the like may be quickly performed and valuable material recovered which has heretofore been irretrievably lost.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation illustrating my invention in its preferred embodiment and the use thereof, Figure 2 is a view in side elevation of the locator detached, Figure 3 is a view in top plan, Figure 4 is a view in vertical section of a portion of the locator and taken on the line 4—4 of Figure 3, Figure 5 is a view in plan of the rocker, Figure 6 is a view in side elevation of the standard, and Figure 7 is a fragmentary view in section taken taken on the line 7—7 of Figure 5.

Referring to the drawings by numerals, according to my invention, a float 1 is provided at one end of a line 2 reeled up on a spool 3 suitably mounted for rotation in an open top rectangular housing 4 secured in any desired manner on top of an elongated base panel 5 provided with holes 6 adjacent the end thereof for attachment by bolts, not shown, in substantially horizontal position, preferably, for instance, on the fuselage of an airplane A.

The float 1 is preferably of elongated, hollow construction and wedge-shaped longitudinally, in side elevation, with a flat bottom 7, parallel side portions 8 and from which the sides converge, as at 9, to provide a reduced end 10 on the float.

An arm 11 extends from the reduced end 10 of the float 1 and terminates in a closed loop 12 to which the beforementioned free end of the line 2 is suitably secured.

The float 1 is releasably anchored to the panel 5 by means of a pair of separable detents 13 normally upstanding side by side in opposed engaging relation from a pivot pin 14 extending transversely of the panel 1 through a bar 15 suitably secured on, or forming part of, the base panel 5 and extending longitudinally thereof in the approximate center of the same with a notched end 16 through which the pin 14 passes and which straddles the lower ends of the detents 13. The lower ends of the detents 13 are loosely journaled on the pin 14 for separative movement and for swinging of the detents lengthwise of the panel 1 and laterally thereof for a purpose which will be seen.

The detents 13 are of semi-circular form transversely with flat sides opposed and tapered downwardly, as best shown in Figure 4. The upper ends of the detents 13 are provided with a pair of grapple forming hooks 17 adapted to close around the loops 12 when the detents 13 are engaged, or closed. An expansion spring 18 suitably anchored in sockets 19 in said detents 13 tends to separate the latter and the hooks 17 to release the loop 12.

The detents 13 are normally held engaged, or closed, and hence the hooks 17, by a rocker 20 operative under the weight of the float 1 thereon to swing said detents toward each other and also operative under the influence of gravity, when the float is removed therefrom, to permit the detents 13 and hooks 17 to separate, or open, and thereby release the loop 12 and float 1.

The rocker 20 comprises a shank 21 extending lengthwise in the longitudinal center of the panel 5 and having a loop end 22 surrounding the detents 13 and slightly smaller in internal diameter than the larger upper ends of said detents, the arrangement being such that when said end 22 of the rocker is rocked into an upwardly inclined position into engagement with said larger ends of the detents 13, the latter will be forced into engaged, closed relation, and when said end 22 of said rocker is rocked downwardly, the detents 13 are released for separation, or opening, under the influence of the spring 18. Preferably, the loop end 22 of the shank 21 is internally beveled, as at 23, to obviate binding of the same against the detents 13. The rocker 20 is pivotally mounted intermediate its ends by a transverse pin 25 and a forked standard 26 straddling the shank 21 and upstanding from the end of the bar 15 opposite the notched end thereof. Suitably secured on the end of the shank 21 of the rocker 20 on the side of the pin 25 opposite the loop end 22 is a flat saddle 27 for seating the float 1 and which is provided with side flanges 28 between which the sides 8 of the float fit to prevent the float from sliding sideways off the saddle.

As will be manifest, the float 1 acts as a counterbalance weight maintaining the looped end 22 of the rocker 20 in the described upwardly inclined position and the detents 13 closed, together with the hooks 17, so that said hooks anchor the float to the detents 13 when the float is seated in the saddle 21. Also, the reduced end 10 of the float 1 provides for increasing the effective weight of the float on the rocker 20 and for rise of the float to the surface S of the water in upstanding position.

The manner in which the described invention operates will be readily understood from the foregoing. As the aircraft A sinks, the float 1 rises off the rocker 20 relieving the saddle end of the rocker of the counterbalancing weight provided by said float and thereby releases the float so that the loop end 22 may drop under the influence of gravity and release the detents 13 for separative, or opening, movement together with the hooks 17. Thus, the loop end 12 of the arm 11 is released so that the float 1 may rise to the surface unwinding the line 2 as it rises and thereby provide a visible mark indicating the location of the craft so that it may be readily found for salvage or other purposes.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What I claim is:

1. In a device for indicating on the surface of water the location of a sunken airplane or the like, a base adapted to be mounted on said airplane, a line attached at one end to said base to be extended to said surface, a float attached to the other end of the line to rise to the surface, means to anchor the float to said base tending to release the float, and float supporting means mounted on said base and operative by the weight of the float thereon to prevent release of the float by said anchoring means.

2. In a device for indicating on the surface of water the location of a sunken airplane or the like, a base adapted to be mounted on said airplane, a line attached at one end to said base to be extended to said surface, a float attached to the other end of the line to rise to the surface, means to anchor the float to said base tending to release the float, and float supporting means mounted on said base and operative by the weight of the float thereon to prevent release of the float by said anchoring means, said anchoring means comprising a pair of detent members relatively separable to release said float.

3. In a device for indicating on the surface of water the location of a sunken airplane or the like, a base adapted to be mounted on said airplane, a line attached at one end to said base to be extended to said surface, a float attached to the other end of the line to rise to the surface, means to anchor the float to said base tending to release the float, and float supporting means mounted on said base and operative by the weight of the float thereon to prevent release of the float by said anchoring means, said anchoring means comprising a pair of detent members relatively separable to release said float, said supporting means comprising a rocker including a part embracing said detents and confining the same against separation while the float is supported by said supporting means.

JOHN A. TARBURTON.